(12) United States Patent
Kim et al.

(10) Patent No.: US 11,554,362 B2
(45) Date of Patent: Jan. 17, 2023

(54) RARE-EARTH METAL VANADATES CATALYSTS FOR NO$_x$ REDUCTION AT LOW TEMPERATURES

(71) Applicant: KOREA INSTITUTE OF SCIENCE AND TECHNOLOGY, Seoul (KR)

(72) Inventors: Jongsik Kim, Seoul (KR); Heon Phil Ha, Seoul (KR); Dong-Wook Kwon, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 99 days.

(21) Appl. No.: 17/138,131

(22) Filed: Dec. 30, 2020

(65) Prior Publication Data

US 2021/0331141 A1  Oct. 28, 2021

(30) Foreign Application Priority Data

Apr. 27, 2020 (KR) .................. 10-2020-0050936

(51) Int. Cl.
| | |
|---|---|
| *B01J 23/94* | (2006.01) |
| *B01J 37/20* | (2006.01) |
| *B01J 23/10* | (2006.01) |
| *B01D 53/94* | (2006.01) |
| *B01J 23/847* | (2006.01) |

(52) U.S. Cl.
CPC .......... *B01J 23/10* (2013.01); *B01D 53/9418* (2013.01); *B01J 23/8472* (2013.01); *B01D 2255/206* (2013.01); *B01D 2255/20723* (2013.01)

(58) Field of Classification Search
None
See application file for complete search history.

(56) References Cited

U.S. PATENT DOCUMENTS

| | | | |
|---|---|---|---|
| 2001/0049339 | A1 | 12/2001 | Schafer-Sindlinger et al. |
| 2002/0090560 | A1* | 7/2002 | Letschert ........... C09K 11/7789 |
| | | | 430/25 |
| 2013/0280159 | A1 | 10/2013 | Takesima et al. |
| 2015/0118485 | A1* | 4/2015 | Wang ..................... C23C 14/08 |
| | | | 427/454 |
| 2019/0193058 | A1 | 6/2019 | Schermanz et al. |
| 2020/0215518 | A1 | 7/2020 | Kim et al. |

FOREIGN PATENT DOCUMENTS

| | | |
|---|---|---|
| CN | 107282037 A | 10/2017 |
| CN | 106938200 * | 11/2017 |
| JP | 2001-347164 A | 12/2001 |
| KR | 200170035270 * | 3/2017 |
| KR | 101798713 B1 | 11/2017 |
| KR | 10-2045919 B1 | 11/2019 |

OTHER PUBLICATIONS

Takatoshi Tojo et al., "Mechanochemical synthesis of rare earth orthovandates from R$_2$O$_3$ (R=rare earth elements) and V$_2$O$_5$ powders", Journal of Alloys and Compounds, Jan. 16, 2007, pp. 219-222, vol. 427.

Extended European Search Report dated Jun. 17, 2021.

* cited by examiner

*Primary Examiner* — Sheng H Davis

(74) *Attorney, Agent, or Firm* — Rabin & Berdo, P.C.

(57) ABSTRACT

Provided are catalysts for reduction of nitrogen oxides including an active site including lanthanum vanadate represented by at least one of Formula 1 and Formula 2 and a support carrying the active site.

LaVO$_4$ (wherein LaVO$_4$ is polymorphous and has a tetragonal or monoclinic crystal structure)     Formula 1

LaV$_3$O$_9$ (wherein LaV$_3$O$_9$ has a monoclinic crystal structure)     Formula 2.

10 Claims, 10 Drawing Sheets

RARE-EARTH METAL VANADATES CATALYSTS FOR NO$_x$ REDUCTION AT LOW TEMPERATURES

CROSS-REFERENCE TO RELATED APPLICATION

This application claims the benefit of Korean Patent Application No. 10-2020-0050936, filed on Apr. 27, 2020, in the Korean Intellectual Property Office, the disclosure of which is incorporated herein in its entirety by reference.

BACKGROUND

1. Field

The present invention relates to a rear-earth metal vanadate catalyst for reduction of nitrogen oxides (NO$_X$), and more particularly, to a heterogeneous catalyst for NO$_X$ reduction including a lanthanum vanadate as an active site in a support and a method of manufacturing the same.

2. Description of the Related Art

Recently, selective catalytic reduction of NO$_X$ (SCR) for stably, with high efficiency, converting nitrogen oxides (NO$_X$), one of the main causes of secondary fine dusts, with ammonia (NH$_3$) proceeds according to Reaction Schemes 1 and 2.

  (1)

  (2)

Enhancement of performance, stability, and persistence of the above-described SCR process is possible by improving surface characteristics of a commercially available catalyst applied to the SCR process. For example, representative examples of the commercially available catalyst applied to SCR processes of power plants, sintering furnaces, low-speed and high-speed ships, and cement factories are vanadium oxide-WO$_3$/TiO$_2$ (where a vanadium oxide (V oxide) includes at least one species selected from V$_2$O$_3$, VO$_2$, and V$_2$O$_5$). One of the methods for enhancing surface characteristics of the commercially available catalyst may be structural modification of the vanadium oxide (V oxide) applied as an active site of the catalyst. Specifically, metal vanadates formed by chemical fusion of a vanadium oxide and either of a transition metal TM oxide or a rare-earth metal RM oxide may be used as active sites of SCR reaction. More specifically, metal vanadates, as composite oxides of vanadium and either of transition metal or rear-earth metal, may solve at least one of the following problems of or requirements for vanadium oxide active sites included in the commercially available catalyst: (1) congregation phenomenon of catalytic active sites occurring during SCR reaction due to low melting point, (2) relatively low redox cycling traits, (3) relatively small numbers of Brönsted acid sites or Lewis acid sites, (4) decreased SCR reaction efficiency per unit hour due to weak interaction between NH$_3$/NO$_X$ and acid sites or strong interaction between H$_2$O and acid sites, (5) absence of rapid SCR reaction at low temperature (Reaction Scheme 3), (6) insufficient durability against poisoning by SO$_2$ contained in exhaust gas on the surface of the catalyst, (7) insufficient durability against poisoning by ammonium sulfate ((NR$_4$)$_2$SO$_4$, AS) and ammonium bisulfate ((NH$_4$)HSO$_4$, ABS) generated during SCR reaction based on a series of chemical reactions according to Reaction Schemes 4 to 6 on the surface of the catalyst, (8) insufficient durability against poisoning by an alkali-metal-based compound contained in exhaust gas on the surface of the catalyst, and 9) insufficient durability against hydrothermal aging due to structural instability of the vanadium oxide active site or the support.

For example, in the case of the transition metal vanadates (TM)V$_2$O$_6$ (where TM=Mn, Co, Ni, or Cu), Cu$_3$V$_2$O$_8$, and Fe$_2$V$_4$O$_{13}$, at least one of the problems or requirements described above in (1) to (7) may be improved compared to the commercial catalyst, and in the case of the rear-earth metal vanadates CeVO$_4$, ErVO$_4$, and TbVO$_4$, the problems described above in (8) and (9) may be improved compared to the commercial catalyst.

  (3)

  (4)

  (5)

  (6)

However, despite the advantages of the above-described rear-earth metal vanadates as active sites of the SCR catalyst, a catalytic crystal phase characterized only by (RM)VO$_4$ (where RM is a rear-earth metal, RM=Ce, Er, Tb, or Yb) has only been reported to data.

SUMMARY

The present invention has been proposed to solve various problems of the commercial catalysts including the above problems, and an object of the present invention is to provide a rear-earth metal vanadate as a catalytic crystal phase of SCR reaction. Specifically, provided is a heterogeneous catalyst including at least one type of lanthanum vanadate crystal phases as active sites of SCR reaction, having superior catalytic characteristics to commercial catalyst, and manufactured with lower costs and a method of manufacturing the same. The present invention also provides a heterogeneous catalyst having improves acid character, redox cycling feature, and durability against poisoning substances (H$_2$O, SO$_2$, AS/ABS, and alkali-metal) and hydrothermal aging by functionalizing (sulfating) the surface of the catalyst with SO$_Y^{2-}$ (where Y is 3 or 4) or including an oxide of a Group 15 or 16 element as a promotor, and a method of manufacturing the catalyst. However, these problems are exemplary, and the scope of the present invention is not limited thereby.

Additional aspects will be set forth in part in the description which follows and, in part, will be apparent from the description, or may be learned by practice of the presented embodiments.

According to an aspect of the present invention, provided is a catalyst for reduction of nitrogen oxides including: an active site including lanthanum vanadate represented by Formula 1 or Formula 2; and a support carrying the active site,

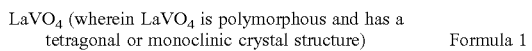   Formula 1

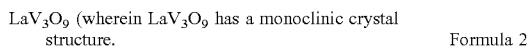   Formula 2

According to another aspect of the present invention, provided is a catalyst for reduction of nitrogen oxides including: a first active site including a vanadate represented by Formula 1; a second active site including a vanadate represented by Formula 2; and a support carrying both the first active site and the second active site.

According to an embodiment of the present invention, the support may further include an oxide of a Group 15 or 16 element as a promotor.

According to an embodiment of the present invention, the Group 15 or 16 element may be one element selected from the group consisting of nitrogen (N), phosphorus (P), sulfur (S), arsenic (As), selenium (Se), antimony (Sb), tellurium (Te), bismuth (Bi), polonium (Po), moscovium (Mc), and livermorium (Lv), or any combination thereof.

According to an embodiment of the present invention, at least one portion of the surface of the catalyst may be sulfated.

According to an embodiment of the present invention, the support may include one of carbon (C), $Al_2O_3$, MgO, $ZrO_2$, $CeO_2$, $TiO_2$, and $SiO_2$.

According to an embodiment of the present invention, the amount of the lanthanum vanadate represented by Formula 1 or the lanthanum vanadate represented by Formula 2 may be in the range of $10^{-4}$ parts by weight to 50 parts by weight based on 100 parts by weight of the support.

According to an embodiment of the present invention, the support may have a porous structure.

According to another aspect of the present invention, provided is a method of manufacturing a catalyst for reduction of nitrogen oxides including: mixing a vanadium precursor solution with a lanthanum precursor solution; adding a material constituting a support to the mixed solution; and obtaining solids from the mixed solution, and calcining the solids to prepare a catalyst including a support carrying a lanthanum vanadate represented by Formula 1 or 2 as an active site or both a lanthanum vanadate represented by Formula 1 as a first active site and a lanthanum vanadate represented by Formula 2 as a second active site, $LaVO_4$ (wherein $LaVO_4$ is polymorphous and has a tetragonal or monoclinic crystal structure)     Formula 1

$LaV_3O_9$ (wherein $LaV_3O_9$ has a monoclinic crystal structure).     Formula 2

According to an embodiment of the present invention, the vanadium precursor solution may include a solution in which at least one of $NH_4VO_3$, $NaVO_3$, $VCl_2$, $VCl_3$, $VBr_3$, $VCl_3 \cdot 3C_4H_8O$, $VO(C_5H_7O_2)_2$, $VO(OC_2H_5)_3$, $VC_{10}H_{10}Cl_2$, $VC_{18}H_{14}I$, $VOCl_3$, $VOF_3$, $VO(OCH(CH_3)_2)_3$, $V(C_5H_7O_2)_3$, $VOSO_4$, and $V(C_5H_5)_2$ is dissolved.

According to an embodiment of the present invention, the lanthanum precursor solution may include a solution in which at least one of $LaF_3$, $LaB_6$, $LaCl_3$, $La(CH_3CO_2)_3$, $LaI_3$, $La_2(C_2O_4)_3$, $La(CF_3SO_3)_3$, $La(NO_3)_3$, $La(C_9H_{21}O_3)$, $La(C_5H_7O_2)_3$, $LaBr_3$, $LaPO_4$, $La_2(CO_3)_3$, $La(OH)_3$, and $La_2(SO_4)_3$ is dissolved.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
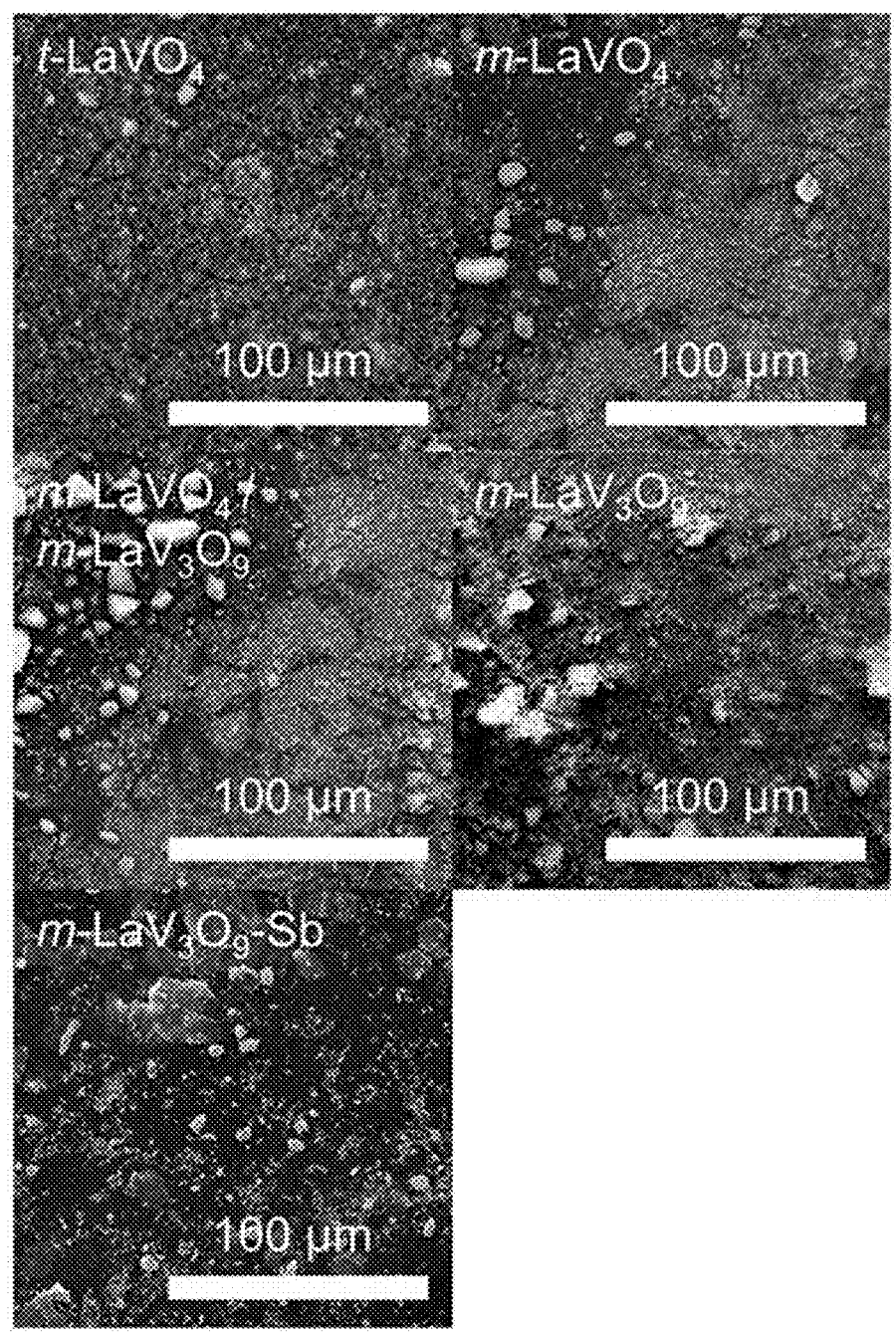
FIG. 1 shows observation results of catalysts manufactured in Examples 1 to 5 according to the present invention using a scanning electron microscope (SEM)

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein, in connection with one embodiment, may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views and some elements in the drawings may be exaggerated for descriptive convenience.

Hereinafter, embodiments of the present invention will be described in detail with reference to the accompanying drawings so that these embodiments may be readily implemented by those skilled in the art.

A catalyst for selective catalytic reduction of $NO_X$ (SCR catalyst) according to an embodiment of the present invention includes an active site from which a product is desorbed after a reactant is adsorbed thereto and reacted thereon, and a support carrying the active site.

Catalysts for $NO_X$ reduction according to first and second embodiments include a lanthanum vanadate having a tetragonal (t) phase or a monoclinic (m) phase represented by Formula 1 below as active sites. They are referred to as "t-$LaVO_4$" and "m-$LaVO_4$", respectively.

$LaVO_4$ (wherein $LaVO_4$ is polymorphous and has a tetragonal or monoclinic crystal structure)     Formula 1

Catalysts for $NO_X$ reduction according to a third embodiment of the present invention include both a lanthanum vanadate having the tetragonal (t) phase or the monoclinic (m) phase represented by Formula 1 and a lanthanum vanadate having the monoclinic (m) phase represented by Formula 2 as active sites. They are referred to as "t-$LaVO_4$/m-$LaV_3O_9$" or "m-$LaVO_4$/m-$LaV_3O_9$".

$LaV_3O_9$ (wherein $LaV_3O_9$ has a monoclinic crystal structure)     Formula 2

Catalysts for $NO_X$ reduction according to a fourth embodiment of the present invention include a lanthanum vanadate having the monoclinic (m) phase represented by Formula 2 as an active site. These are referred to as "m-$LaV_3O_9$".

According to embodiments of the present invention, the active sites substantially consists of lanthanum vanadates. For example, lanthanum vanadates may be included in the active site in an amount of 90 wt % or more. Preferably, the active site may include 95 wt % or more, more preferably 99 wt % or more, of lanthanum vanadates and the remainder may consist of inevitable materials that may be generated during the manufacturing process. Unlike a conventional SCR catalyst including lanthanum as a promotor for enhancing thermal stability at high temperature and improving performance at both low and high temperature, the catalyst according to an embodiment of the present invention may have a surface with high $NO_X$ conversion and high $N_2$ selectivity during SCR by applying a lanthanum vanadate as an active site.

In addition, since the catalyst according to embodiments of the present invention includes a composite oxide of vanadium and lanthanum as an active site, superior catalytic properties may be obtained when compared to catalysts including a vanadium oxide and a lanthanum oxide separately. The catalyst according to an embodiment of the present invention may have minimized poisoning by $SO_2$ and excellent resistance to poisons ($H_2O/SO_2/AS/ABS$) when compared with conventional SCR catalysts for removing nitrogen oxides including only a vanadium oxide as an active site.

The catalyst for $NO_X$ reduction according to the third embodiment of the present invention has a configuration in which both the first active site and the second active site are supported on one support. The first active site and the second active site may be randomly distributed on the support, and a relative weight ratio of the first active site to the second active site may vary in the range of 0.1:99.9 to 99.9:0.1.

The above-described vanadates according to an embodiment of the present invention may be manufactured by various methods. For example, the vanadates may be manufactured by at least one method of hydrothermal synthesis, solvothermal synthesis, a mechano-chemical method such as ball-milling, non-templated or templated synthesis, a wet or dry impregnation method, and a thermal decomposition method using a Mn-V, Co-V, or Ni-V based complex.

The vanadate may be distributed on a porous support which will be described below and have a diameter (maximum diameter) of 0.1 nm to 500 μm. In this regard, the vanadates may be in an amount of $10^{-4}$ parts by weight to 50 parts by weight based on 100 parts by weight of the support.

The above-described catalyst for $NO_X$ reduction according to an embodiment of the present invention may further include a promotor. The active sites of the catalyst for $NO_X$ reduction need to inhibit adsorption of sulfur dioxide ($SO_2$) included in flue gas or have low performance in oxidation of sulfur dioxide ($SO_2$). Ammonia ($NH_3$) used as a reducing agent reacts with sulfur trioxide ($SO_3$) as shown in Reaction Schemes (4) to (6) below to precipitate poisoning substances such as ammonium sulfate or ammonium bisulfate on the surface of the catalyst. Ammonium sulfate may be irreversibly adsorbed to the active site of the catalyst at a low temperature of 300° C. or lower. Ammonium sulfate adsorbed to the surface of the catalyst inhibits adsorption of nitrogen oxides ($NO_X$) and ammonia, as the reducing agent, and thus SCR activity of the catalyst per unit hour may decrease. In addition, sulfur trioxide ($SO_3$) generated by oxidation of sulfur dioxide binds to water vapor included in flue gas to produce sulfuric acid ($H_2SO_4$), which may cause a problem of corrosion at a downstream system of the SCR process.

$$SO_2 + \tfrac{1}{2}O_2 \rightarrow SO_3 \tag{4}$$

$$SO_3 + 2NH_3 + H_2O \rightarrow (NH_4)_2SO_4 \tag{5}$$

$$SO_3 + NH_3 + H_2O \rightarrow (NH_4)HSO_4 \tag{6}$$

The promotor may play a role in improving resistance to poisoning by a poisoning substance such as sulfur dioxide ($SO_2$) or ammonium sulfates occurring during SCR reaction on the surface of the catalyst. For example, the promotor may reduce a binding energy between the sulfur dioxide ($SO_2$) and the surface of the catalyst. Accordingly, oxidation of sulfur dioxide ($SO_2$) (Reaction Scheme 4) that may occur during SCR reaction at a low temperature may be minimized. In addition, the amount of ammonium sulfate (AS, Reaction Scheme 5) or ammonium bisulfate (ABS, Reaction Scheme 6) generated by reaction between sulfur dioxide and ammonia and adsorbed to the surface of the catalyst may be minimized, thereby preventing a decrease in SCR activity of the catalyst per unit hour caused by poisoning of the surface of the catalyst. In addition, the promotor may be added as a component constituting the surface of the catalyst capable of decomposing the above-described AS and ABS at a low temperature.

The promotor includes a Group 15 or 16 element. The Group 15 or 16 element may include at least one element selected from the group consisting of nitrogen (N), phosphorus (P), sulfur (5), arsenic (As), selenium (Se), antimony (Sb), tellurium (Te), bismuth (Bi), polonium (Po), moscovium (Mc), and livermorium (Lv), or any combination thereof. The amount of the promotor may be from $10^{-4}$ parts by weight to 50 parts by weight, preferably 3 parts by weight or less, and more preferably 0.5 to 2 parts by weight, based on 100 parts by weight of the support.

The support plays a role in distributing and supporting the lanthanum vanadate and the promotor. The active site of the catalyst needs to have high oxidizing and reducing properties for easy adsorption and conversion of nitrogen oxides ($NO_X$). In this case, when the catalyst is manufactured by supporting the vanadate on an appropriate support, highly reactive oxygen species ($O_2$) present in the support may be efficiently supplied to the active site. That is, oxidizing and reducing properties of the catalyst may be improved. At the same time, when the vanadate is distributed on the support with a high density, the catalytic efficiency may further be increased. Therefore, a catalyst for $NO_X$ reduction including the support capable of providing the above-described environment may be manufactured.

The support may include carbon (C) or a metal oxide. The metal oxide may be selected from $Al_2O_3$, $MgO$, $ZrO_2$, $CeO_2$, $TiO_2$, and $SiO_2$.

The catalyst for $NO_X$ reduction according to an embodiment of the present invention may have a morphology with a large surface area. As the surface area increases, adsorption rates of reactants, i.e., nitrogen oxides or ammonia, increase, and reaction rates increase, thereby increasing reduction efficiency of nitrogen oxides ($NO_X$). In order to obtain a wide surface area, the catalyst may have a porous structure. For example, a porous structure having a wide surface area may be configured by aggregating a powder material used to form the support by calcining.

The catalyst for $NO_X$ reduction according to an embodiment of the present invention may be functionalized by sulfating the surface thereof. The sulfation according to the present invention refers to functionalization of the catalyst with $SO_Y^{2-}$. As used herein, the term "functionalization" may indicate a process of improving performance of the catalyst by increasing the number of active sites of the catalyst or by improving characteristics such as adsorption of a reactant to the catalyst. For example, when the catalyst for $NO_X$ reduction of the present invention is sulfated and functionalized with $SO_Y^{2-}$, the surface of the catalyst advantageous for adsorption and convention of nitrogen oxides may be implemented and new active sites may be formed.

The properties of S—O bonds included in the $SO_Y^{2-}$ species bonded to metal species on the surface of the catalyst may be adjusted by functionalization with $SO_Y^{2-}$ by sulfating the surface of the catalyst. Specifically, $SO_Y^{2-}$ species present on the surface of the catalyst may bind to the metal species of the catalyst in a bi-dentate binding form, when they have ionic character, and bind to the metal species in a mono-dentate binding, when they have covalent character. SCR reaction performance of the catalyst may vary according to distribution in the catalyst in the bonded form described above.

In this case, according to an embodiment of the present invention, sulfation may be performed by a reaction gas including $SO_2$ and $O_2$. In addition, $SO_2$ and $O_2$ included in the reaction gas may have a concentration of 10 ppm to $10^5$ ppm, a flow rate of $10^{-5}$ mL min$^{-1}$ to $10^5$ mL min$^{-1}$, a pressure of $10^{-5}$ bar to $10^5$ bar. In addition, the sulfation may be performed at a temperature of 200° C. to 800° C. for 0.1 hours to 24 hours.

When the conditions for sulfation of the catalyst are less than the above ranges, functionalization effects of $SO_Y^{2-}$ on the catalyst may be insufficient. Also, when the conditions are greater than the above ranges, oxygen species ($O_\alpha$), which improve oxidation and reduction characteristics of the surface of the catalyst during SCR reaction or improve $NO_2$ production efficiency for fast SCR reaction of Equation (3) below, may disappear due to excessive functionalization of the surface of the support. Therefore, sulfation of the catalyst may be performed within the above ranges of conditions.

$$NO+NO_2+2NH_3 \rightarrow 2N_2+3H_2O \qquad (3)$$

The catalyst modified by $SO_Y^{2-}$ functionalization by sulfation includes $SO_Y^{2-}$—$NH_4$ species additionally formed thereon. $SO_Y^{2-}$—$NH_4$ species serve as Brönsted acid sites to which the reducing agent, ammonia ($NH_3$), is adsorbed. That is, the catalyst functionalized by sulfation according to the present invention may have an increased number of reaction active sites compared to non-functionalized catalysts. In addition, the catalyst modified by functionalization using $SO_Y^{2-}$ may include additionally formed metal-$SO_Y^{2-}$ species, thereby having improved oxidation/reduction characteristics when compared to non-functionalized catalysts. In addition, the metal-$SO_Y^{2-}$ species may increase $NO_2$ generation efficiency for fast SCR reaction shown in Reaction Scheme (3) above.

That is, in accordance with $SO_Y^{2-}$ (where Y is 3 or 4) functionalization (sulfation) conditions, the number of acid sites may be adjusted or binding strength with reactants ($NO_X$ and $NH_3$)/poisoning substances (AS and ABS) may be adjusted. Therefore, when a vanadate optimal for SCR reaction is synthesized, (1) a plurality of Brönsted acid sites may be provided, (2) Lewis acid sites unsaturated due to a plurality of coordinate bonds may be provided, (3) optimum reaction intensity with reactants appropriate for efficient progress of turnover cycles of $NO_X$ may be provided, (4) NO oxidation efficiency appropriate for fast SCR reaction may be provided, and (5) the vanadate may be a component of a catalyst surface having the ability to decompose poisoning substances of AS and ABS at a low temperature, during SCR reaction.

Hereinafter, a method of manufacturing a catalyst for $NO_X$ reduction according to an embodiment of the present invention will be described.

First, a vanadium precursor solution and a lanthanum precursor solution are prepared and mixed to prepare a mixed solution. After sufficiently stirring the mixed solution, the mixed solution is subjected to hydrothermal synthesis or dehydration to obtain solids, and the solids are calcined to prepare a catalyst for $NO_X$ reduction in which a lanthanum vanadate is distributed.

In this regard, $LaVO_4$ active sites having different crystal phases (tetragonal or monoclinic) may be distributed on the support by diversifying types of compounds capable of forming coordinate bonds with vanadium ions ($V^{5+}$) (oxalic acid or ethylenediaminetetraacetic acid). Also, by adjusting the pH of the mixed solution, catalysts in which both $LaVO_4$ active sites and $LaV_3O_9$ active sites are distributed on the support or only $LaV_3O_9$ active sites are distributed on the support may be manufactured.

The vanadium precursor solution may be, for example, a solution in which a vanadium compound is dissolved in a solvent. Examples of the vanadium compound include $NH_4VO_3$, $NaVO_3$, $VCl_2$, $VCl_3$, $VBr_3$, $VCl_3 \cdot 3C_4H_8O$, $VO(C_5H_7O_2)_2$, $VO(OC_2H_5)_3$, $VC_{10}H_{10}Cl_2$, $VC_{18}H_{14}I$, $VOCl_3$, $VOF_3$, $VO(OCH(CH_3)_2)_3$, $V(C_5H_7O_2)_3$, $VOSO_4$ and $V(C_5H_5)_2$.

The lanthanum precursor solution may be, for example, a solution in which a lanthanum compound is dissolved in a solvent. Examples of the lanthanum compound include $LaF_3$, $LaB_6$, $LaCl_3$, $La(CH_3CO_2)_3$, $LaI_3$, $La_2(C_2O_4)_3$, $La(CF_3SO_3)_3$, $La(NO_3)_3$, $La(C_9H_{21}O_3)$, $La(C_5H_7O_2)_3$, $LaBr_3$, $LaPO_4$, $La_2(CO_3)_3$, $La(OH)_3$, and $La_2(SO_4)_3$.

In the above-described manufacturing method, a promotor may be formed in the catalyst by using a support to which a Group 15 or 16 element is added. For example, powder of a substance constituting the support is mixed with a solution in which a compound of a Group 15 or 16 element is dissolved, stirred, and dehydrated, and then calcined to prepare a support mixed with a promotor.

After manufacturing the catalyst, $SO_Y^{2-}$ functionalization for improving catalytic properties may further be performed. $SO_Y^{2-}$ functionalization may be performed by exposing the surface of the catalyst to a processing gas including sulfur dioxide ($SO_2$) and oxygen ($O_2$) by flowing the processing gas under predetermined flow rate and pressure onto the surface of the catalyst. In Table 1 below, conditions for $SO_Y^{2-}$ functionalization are shown.

TABLE 1

| $SO_2$ content (ppm) | Oxygen content (vol %) | Pressure (bar) | Flow rate of processing gas (mL min$^{-1}$) | Exposure time (h) | Processing temperature (° C.) |
|---|---|---|---|---|---|
| 10~$10^5$ | $10^{-5}$~90 | $10^{-5}$~$10^5$ | $10^{-5}$~$10^5$ | 0.1~24 | 200~800 |

When the conditions for $SO_Y^{2-}$ functionalization include a temperature lower than 200° C., an exposure time shorter than 0.1 hours, a $SO_2$ content less than 10 ppm, an oxygen ($O_2$) content less than $10^{-5}$ vol %, a flow rate slower than $10^{-5}$ mL min$^{-1}$, or a pressure lower than $10^{-5}$ bar, $SO_Y^{2-}$ functionalization effects on the surface of the catalyst may be insignificant. On the contrary, when the conditions include a temperature higher than 800° C., an exposure time longer than 24 hours, a $SO_2$ content more than $10^5$ ppm, an oxygen ($O_2$) content more than 90 vol %, a flow rate faster than $10^5$ mL min$^{-1}$, or a pressure higher than $10^5$ bar, the surface of the support is excessively functionalized with $SO_Y^{2-}$, resulting in disappearance of oxygen ($O_n$) species that increase activity of SCR reaction. Therefore, $SO_Y^{2-}$ functionalization on the surface of the catalyst may be performed under the conditions within the above-described ranges.

Hereinafter, the present invention will be described in more detail with reference to the following examples. However, the following experimental examples are merely presented to exemplify the present invention, and the scope of the present invention is not limited thereto.

Example 1

Preparation of t-LaVO$_4$ Catalyst 0.79 mmol of ethylenediaminetetraacetic acid (EDTA) was added to a solution prepared by dissolving 0.79 mmol of NH$_4$VO$_3$ in 48 mL of distilled water, and 0.79 mmol of La(NO$_3$)$_3$·6H$_2$O was added thereto and stirred. Subsequently, 1.85 g of anatase TiO$_2$ powder (support) was added to the mixed solution, and the mixed solution was stirred for 2 hours while maintaining a pH of 4. After the prepared mixed solution was exposed to hydrothermal synthesis conditions at 180° C. for 48 hours, the resultant was cooled, filtered at room temperature, washed with water, and dried. The dried synthetic intermediate substance was calcined at 500° C. for 5 hours. Solids obtained after calcination were placed in a reactor and exposed to sulfur dioxide (SO$_2$) and oxygen (O$_2$), both diluted with N$_2$, by simultaneously flowing SO$_2$ and O$_2$ thereinto at a flow rate of 500 mL min$^{-1}$ at ambient atmospheric pressure at 500° C. for 45 minutes, and then cooled to room temperature under N$_2$ atmosphere. In the exposure process, the SO$_2$ content was 500 ppm and the O$_2$ content was 3 vol %. Under the conditions as described above, a catalyst according to Example 1 functionalized with $SO_Y^{2-}$ (where Y is 3 or 4) was prepared. Hereinafter, the catalyst of Example 1 is referred to as t-LaVO$_4$.

Example 2

1 Preparation of m-LaVO$_4$ Catalyst

A catalyst according to Example 2 in which only m-LaVO$_4$ was distributed on the surface of the TiO$_2$ support was prepared under the same conditions as the synthesis conditions used in the preparation of the t-LaVO$_4$ catalyst of Example 1, except that 0.79 mmol of oxalic acid was used instead of 0.79 mmol of EDTA. Hereinafter, the catalyst of Example 2 is referred to as m-LaVO$_4$.

Example 3

Preparation of m-LaVa$_4$/m-LaV$_3$O$_9$ Catalyst

A catalyst according to Example 3 in which both m-LaVO$_4$ and m-LaV$_3$O$_9$ were distributed on the surface of the TiO$_2$ support was prepared under the same conditions as the synthesis conditions used in the preparation of the m-La VO$_4$ catalyst of Example 2, except that the pH was adjusted to 2 instead of 4. Hereinafter, the catalyst of Example 3 is referred to as m-LaVO$_4$/m-LaV$_3$O$_9$.

Example 4

Preparation of m-LaV$_3$O$_9$ Catalyst

A catalyst according to Example 4 in which only m-LaV$_3$O$_9$ was distributed on the surface of the TiO$_2$ support was prepared under the same conditions as the synthesis conditions used in the preparation of the m-La VO$_4$ catalyst of Example 2, except that the pH was adjusted to 1 instead of 4. Hereinafter, the catalyst of Example 4 is referred to as m-LaV$_3$O$_9$.

Example 5

Preparation of m-LaV$_3$O$_9$—Sb Catalyst

A catalyst according to Example 5 was prepared under the same conditions as the synthesis conditions used in the preparation of the m-LaV$_3$O$_9$ catalyst of Example 4, except that 1.85 g of TiO$_2$ powder including an antimony oxide (Sb oxide) as a promotor. Hereinafter, the catalyst according to Example 5 is referred to as m-LaV$_3$O$_9$—Sb. In synthesis of TiO$_2$ powder (support) including the Sb oxide as a promotor, 19.4 g of TiO$_2$ was added to 200 ml of distilled water to prepare an aqueous solution and a solution prepared by dissolving 1.47 g of Sb(CH$_3$COOH)$_3$ in 50 ml of acetic acid was added to the aqueous solution, and then the mixture was stirred, dehydrated, and calcined at 500° C. for 5 hours to prepare TiO powder including 3 wt % of Sb relative to TiO$_2$.

Comparative Example 1

Preparation of t-ErVO$_4$ Catalyst

A catalyst according to Comparative Example 1 having a similar vanadium (V) content (2 wt % or less) to those of the catalysts according to Example 1 to 5 and including ErVO$_4$ having a tetragonal crystal phase as an active site was prepared. Specifically, a solution prepared by dissolving 3.93 mmol of Er(NO$_3$)$_3$·5H$_2$O in 70 mL of distilled water was added to a solution prepared by dissolving 3.93 mmol of NH$_4$VO$_3$ in 170 mL of distilled water to prepare a mixed solution, and the mixed solution was stirred for 1 hour. 9.14 g of TiO$_2$ powder was added to the mixed solution and stirred for 1 hour, and then the pH was adjusted to 8 (suitable for nucleation and growth of tetragonal ErVO$_4$), stirred for 4 hours, and dehydrated. Solids obtained therefrom were calcined at 500° C. for 5 hours. The solids obtained after calcination were placed in a reactor and exposed to sulfur dioxide (SO$_2$) and oxygen (O$_2$), both diluted with N$_2$, by simultaneously flowing SO$_2$ and O$_2$ thereinto at a flow rate of 500 mL min$^{-1}$ at ambient atmospheric pressure at 500° C. for 45 minutes, and then cooled to room temperature under N$_2$ atmosphere. In the exposure process, the SO$_2$ content was 500 ppm and the O$_2$ content was 3 vol %. Under the conditions as described above, a catalyst according to Comparative Example 1 functionalized with $SO_Y^{2-}$ (where Y is 3 or 4) was prepared. Hereinafter, the catalyst of Comparative Example 1 is referred to as t-ErVO$_4$.

Comparative Example 2

Preparation of t-Ce$_{0.5}$Er$_{0.5}$VO$_4$ Catalyst

A catalyst according to Comparative Example 2 having a similar vanadium (V) content (2 wt % or less) to those of the catalysts according to Example 1 to 5 and including Ce$_{0.5}$Er$_{0.5}$VO$_4$ having a tetragonal crystal phase as an active site was prepared. Specifically, a solution prepared by dissolving 1.96 mmol of Ce(NO$_3$)$_3$·6H$_2$O and 1.96 mmol of Er(NO$_3$)$_3$·5H$_2$O in 70 mL of distilled water was added to a solution prepared by dissolving 3.93 mmol of NH$_4$VO$_3$ in 170 mL of distilled water to prepare a mixed solution, and the mixed solution was stirred for 1 hour. 9.19 g of $TiO_2$ powder was added to the mixed solution and stirred for 1 hour, and then the pH was adjusted to 8 (suitable for nucleation and growth of tetragonal $Ce_{0.5}Er_{0.5}VO_4$), stirred for 4 hours, and dehydrated. Solids obtained therefrom were calcined at 500° C. for 5 hours. The solids obtained after calcination were placed in a reactor and exposed to sulfur dioxide ($SO_2$) and oxygen ($O_2$), both diluted with $N_2$, by simultaneously flowing $SO_2$ and $O_2$ thereinto at a flow rate of 500 mL $min^{-1}$ at ambient atmospheric pressure at 500° C. for 45 minutes, and then cooled to room temperature under $N_2$ atmosphere. In the exposure process, the $SO_2$ content was 500 ppm and the $O_2$ content was 3 vol %. Under the conditions as described above, a catalyst according to Comparative Example 2 functionalized with $SO_Y^{2-}$ (where Y is 3 or 4) was prepared. Hereinafter, the catalyst of Comparative Example 1 is referred to as t-$Ce_{0.5}Er_{0.5}VO_4$ catalyst.

Comparative Example 3

Preparation of $V_2$—$W_5$ Catalyst

A catalyst according to Comparative Example 3 having a similar vanadium (V) content (2 wt % or less) to those of the catalysts according to Example 1 to 5 and including tungsten as an active site was prepared. Specifically, 9.3 g of anatase $TiO_2$ powder was added to a solution prepared by dissolving 0.46 g of $NH_4VO_3$, 0.67 g of $(NH_4)_{10}(H_2W_{12}O_{42})·4H_2O$, and 0.84 g of $C_2H_2O_4·2H_2O$ in 100 mL of distilled water, and the mixed solution was stirred and dehydrated. Then, the resultant was continuously subjected to calcination at 500° C. for 5 hours to prepare a catalyst including tungsten W. In the catalyst according to Comparative Example 3, vanadium oxide and tungsten oxide, which are independently present, are physically mixed as active sites. The prepared catalyst was exposed to the conditions for $SO_Y^{2-}$ (where Y is 3 or 4) functionalization according to Example 1, thereby finally preparing the catalyst of Comparative Example 3. Hereinafter, the catalyst of Comparative Example 3 will be referred to as $V_2$—$W_5$ catalyst for descriptive convenience.

Examples 6 and 7 and Comparative Example 4

Preparation of m-$LaV_3O_9$—Na, m-$LaV_3O_9$—Sb—Na, and $V_2$—$W_5$—Na Catalysts The surface of the m-$LaV_3O_9$—Sb catalyst prepared in Example 5 was intentionally poisoned by introducing Na species onto the surface of the catalyst in an amount of 60 mol % based on a total number moles of La, V, and Sb included in the m-$LaV_3O_9$—Sb catalyst, thereby preparing m-$LaV_3O_9$—Sb—Na. Specifically, solids obtained by mechanically mixing 0.08268 g of $NaNO_3$ with 1.6 g of Mn—Se (S) catalyst were calcined at 500° C. for 5 hours to prepare m-$LaV_3O_9$—Sb—Na catalyst according to Example 7. The surfaces of the m-$LaV_3O_9$ and $V_2$—$W_5$ catalysts prepared according to Example 4 and Comparative Example 3 respectively were poisoned under the same conditions as described above to prepare m-$LaV_3O_9$—Na and $V_2$—$W_5$—Na catalysts according to Example 6 and Comparative Example 4 respectively.

Examples 8 and 9 and Comparative Example 5

Preparation of m-$LaV_3O_9$—HT, m-$LaV_3O_9$—Sb—HT, and $V_2$—$W_5$—HT Catalysts The m-$LaV_3O_9$, m-$LaV_3O_9$—Sb and $V_2$—$W_5$ catalysts prepared in Examples 4 and 5 and Comparative Example 3 were placed in a reactor and exposed to oxygen ($O_2$) diluted with $N_2$ by flowing $O_2$ and water vapor ($H_2O$) thereinto at a flow rate of 500 mL $min^{-1}$ at ambient atmospheric pressure at 700° C. for 10 hours, and then cooled to room temperature under $N_2$ atmosphere. In the exposure process, the $O_2$ content was 3 vol % and the water vapor ($H_2O$) content was 6 vol %. Under the conditions as described above, catalysts exposed to hydrothermal aging according to Examples 8 and 9 and Comparative Example 5 were prepared. Hereinafter, the catalysts of Examples 8 and 9 and Comparative Example 5 are referred to as m-$LaV_3O_9$—HT, m-$LaV_3O_9$—Sb—HT and $V_2$—$W_5$—HT, respectively.

Experimental Example 1

Analysis of Characteristics of Catalysts

Figure 2:
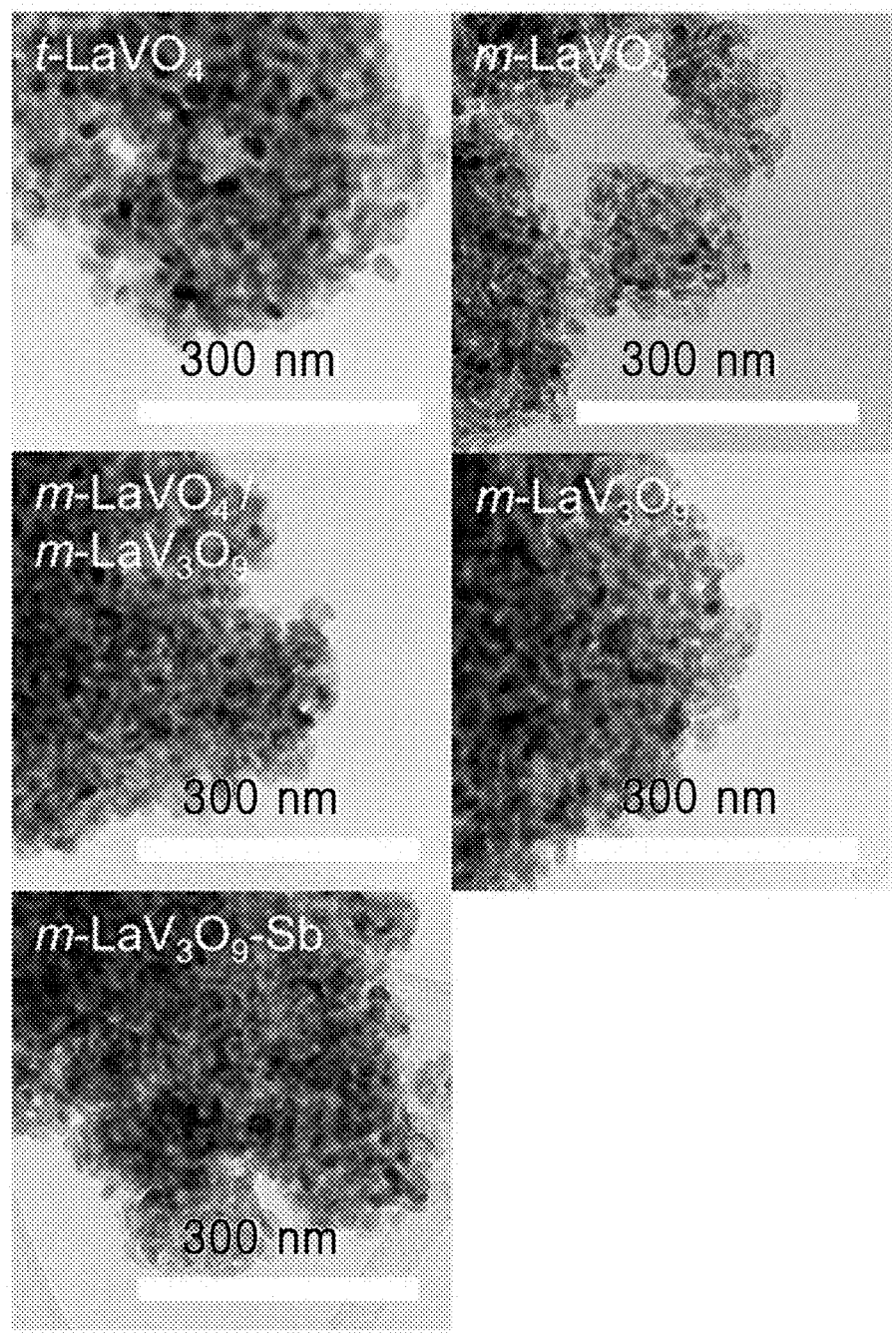
FIG. 2 shows observation results of the catalysts manufactured in Examples 1 to 5 according to the present invention using a high resolution transmission electron microscope (HRTEM)

Surface morphologies of the catalysts prepared in Examples 1 to 5 were analyzed by scanning electron microscopy (SEM) and high resolution transmission electron microscopy (HRTEM) and the results are shown in FIGS. 1 and 2, respectively.

Referring to FIGS. 1 and 2, it was confirmed that the prepared catalysts included porous supports formed of $TiO_2$ agglomerates having a particle size (maximum diameter) of several hundred nanometers to several hundred micrometers.

In order to evaluate the degree of porosity of the catalysts of Examples 1 to 5, BET surface areas and BJH pore volumes were measured by conducting $N_2$ physisorption experiment. In addition, components of the catalysts prepared in Examples 1 to 5 were analyzed using X-ray fluorescence (XRF). Measurement results are shown in Table 2.

TABLE 2

|  | BET surface area | BJH pore volume | V content (wt. %) | La:V (molar ratio) | S content (wt. %) |
| --- | --- | --- | --- | --- | --- |
| Example 1 | 70 $m^2$ $g^{-1}$ | 0.3 $cm^3$ $g^{-1}$ | 1.9 (±0.1), | 1.0 (±0.1):1 | 1.0 (±0.1) |
| Example 2 | 73 $m^2$ $g^{-1}$ | 0.3 $cm^3$ $g^{-1}$ | 2.0 (±0.3), | 1.0 (±0.3):1 | 1.0 (±0.1) |
| Example 3 | 66 $m^2$ $g^{-1}$ | 0.2 $cm^3$ $g^{-1}$ | 2.0 (±0.1), | 0.6 (±0.1):1 | 0.8 (±0.1) |
| Example 4 | 60 $m^2$ $g^{-1}$ | 0.2 $cm^3$ $g^{-1}$ | 2.0 (±0.1), | 0.3 (±0.1):1 | 0.6 (±0.1) |
| Example 5 | 80 $m^2$ $g^{-1}$ | 0.3 $cm^3$ $g^{-1}$ | 2.0 (±0.2), | 0.3 (±0.1):1 | 0.6 (±0.1) |

Based on the BET surface areas and BJH pore volumes, it was confirmed that the catalysts of Examples 1 to 5 had porous structures. In addition, the catalysts had the same V content of 2 wt % based on the total weight of the catalysts.

It was confirmed that the molar ratios of La:V of the catalysts of Examples 1 to 5 were similar to theoretical molar ratios (1:1 in Examples 1 and 2; 0.33:1 to 1:1 in Example 3; and 0.33:1 in Examples 4 and 5). Thus, it confirmed that $LaVO_4$ or $LaV_3O_9$ were successfully distributed on the porous $TiO_2$ support on the surface of the catalysts of Examples 1 to 5.

Figure 3:
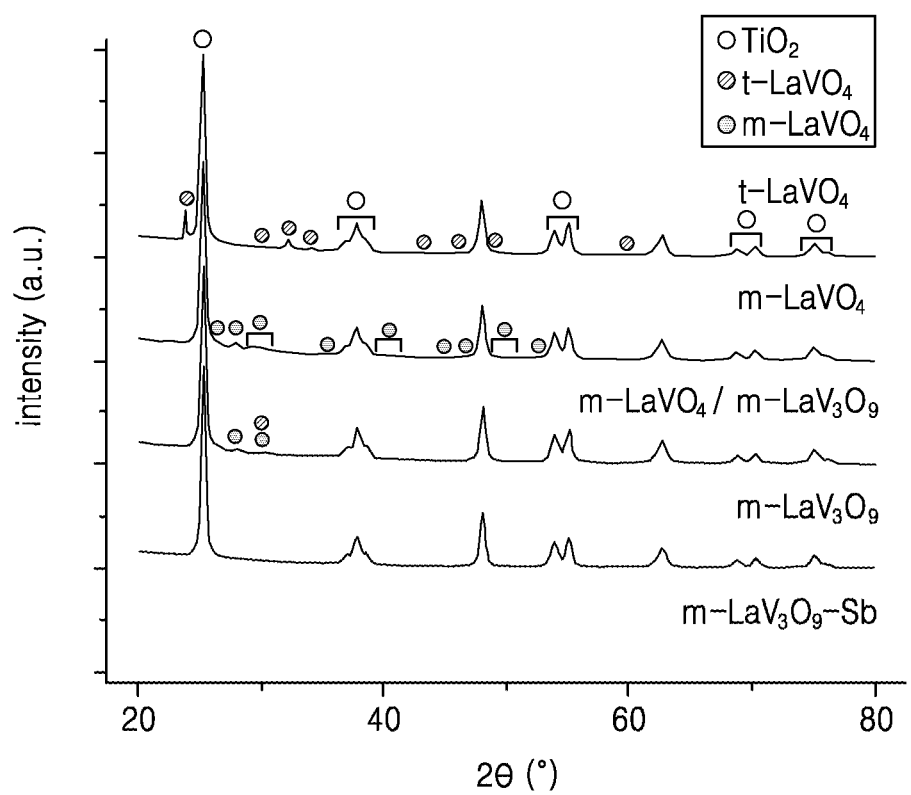
FIG. 3 is a graph illustrating X-ray diffraction patterns (XRD patterns) of the catalysts manufactured in Examples 1 to 5 according to the present invention.

Crystal structures of the catalysts of Examples 1 to 5 were analyzed by using an X-ray diffractometer, and X-ray diffraction (XRD) patterns obtained therefrom are shown in FIG. 3.

Referring to FIG. 3, anatase phase crystal planes having a tetragonal crystal structure indicating the $TiO_2$ support were observed in all of the catalysts of Examples 1 to 5. Meanwhile, crystal planes indicating tetragonal (t-) $LaVO_4$ or monoclinic (m-) $LaVO_4$ crystal particles were observed in the XRD patterns of Examples 1 and 2, respectively. In addition, crystal planes indicating monoclinic (m-) $LaVO_4$ and monoclinic (m-) $LaV_3O_9$ crystal particles were simultaneously observed in the XRD pattern of Example 3. On the contrary, the crystal plane indicating the monoclinic (m-) $LaVO_4$ and monoclinic (m-) $LaV_3O_9$ crystal particles were not observed in the XRD patterns of Examples 4 and 5. This is understood because the size or amount of vanadate crystal particles distributed on the support are not sufficient for X-ray diffraction. Thus, the catalysts of Examples 1 to 5 were analyzed using selected area electron diffraction (SAED) patterns and the results are shown in FIG. 4.

Figure 4:
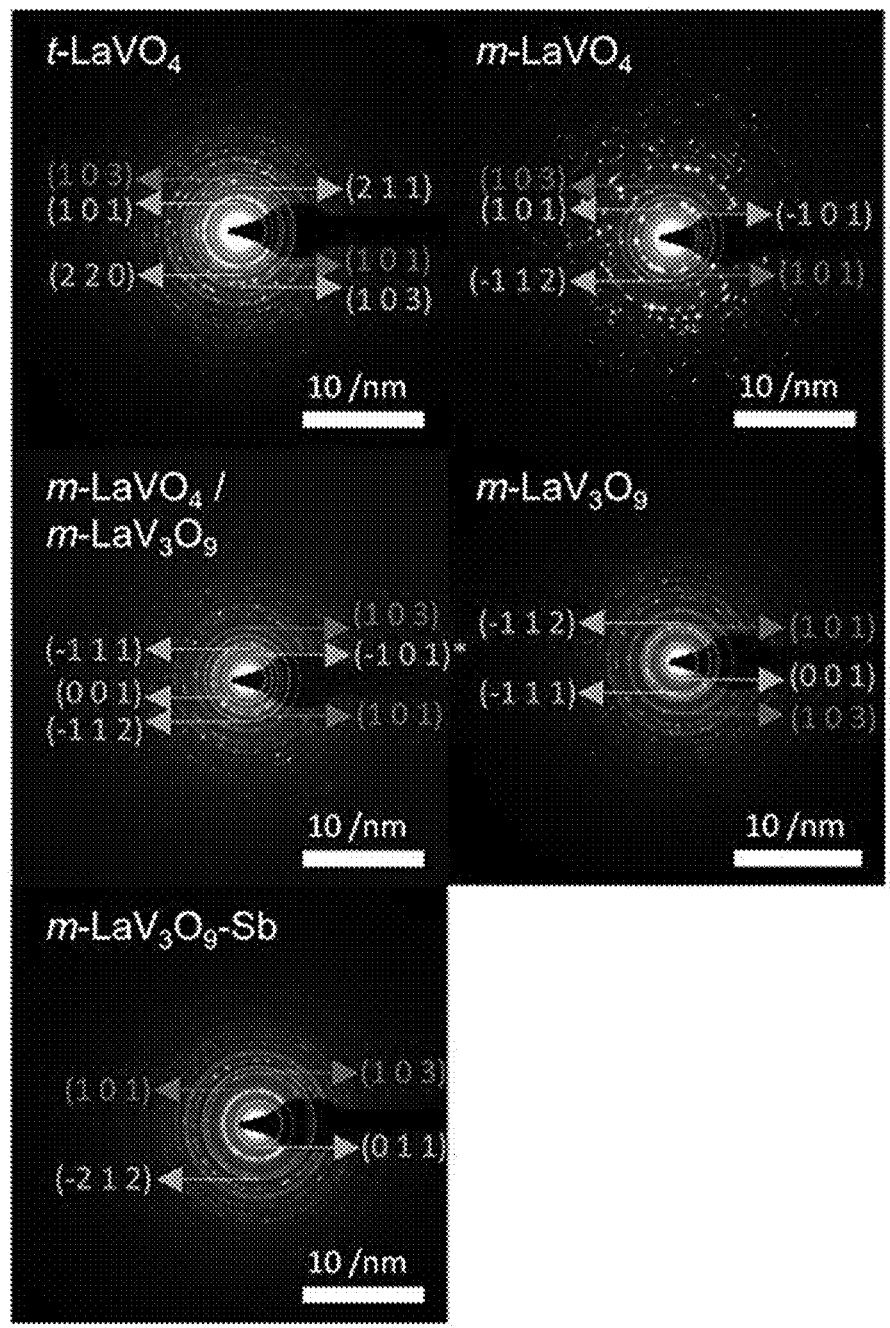
FIG. 4 is a graph illustrating selected area electron diffraction patterns (SAED patterns) of the catalysts manufactured in Examples 1 to 5 according to the present invention.

Referring to FIG. 4, (101), (211), (220), and (103) crystal planes of tetragonal (t-) $LaVO_4$ were observed in the catalyst of Example 1. (−101), (101), and (−112) crystal planes of the monoclinic (m-) $LaVO_4$ were observed in the catalyst of Example 2. In addition, (−111), (001), (−112) crystal planes of monoclinic (m-) $LaVO_4$ and (−101) crystal plane of monoclinic (m-) $LaV_3O_9$ were observed simultaneously in the catalyst of Example 3. Importantly, (001), (−111), (−112) or (011), and (−212) crystal planes of monoclinic (m-) $LaV_3O_9$ were observed in Examples 4 and 5.

Also, (101) and (103) crystal planes corresponding to the anatase phase of $TiO_2$ having the tetragonal crystal structure indicating the $TiO_2$ support were observed in all of the catalysts of Examples 1 to 5. These results are identical to the analysis results of XRD patterns of FIG. 3.

As shown in FIG. 4, patterns of materials other than lanthanum vanadate, e.g., a vanadium oxide or a lanthanum oxide, were not observed in Examples 1 to 5. That is, in Examples 1 to 5 according to the present invention, the vanadium oxide, vanadium, and the lanthanum oxide constitute one composite oxide (lanthanum vanadate), which is not a simple mixture of independent the vanadium oxide and the lanthanum oxide.

Hereinafter, results of SCR performance analysis of the catalysts of Examples 1 to 9 according to the present invention and Comparative Examples 1 to 5 will be described with reference to FIGS. 5 to 10.

Experimental Example 2

Performance Analysis of SCR Reaction (1)

Figure 5:
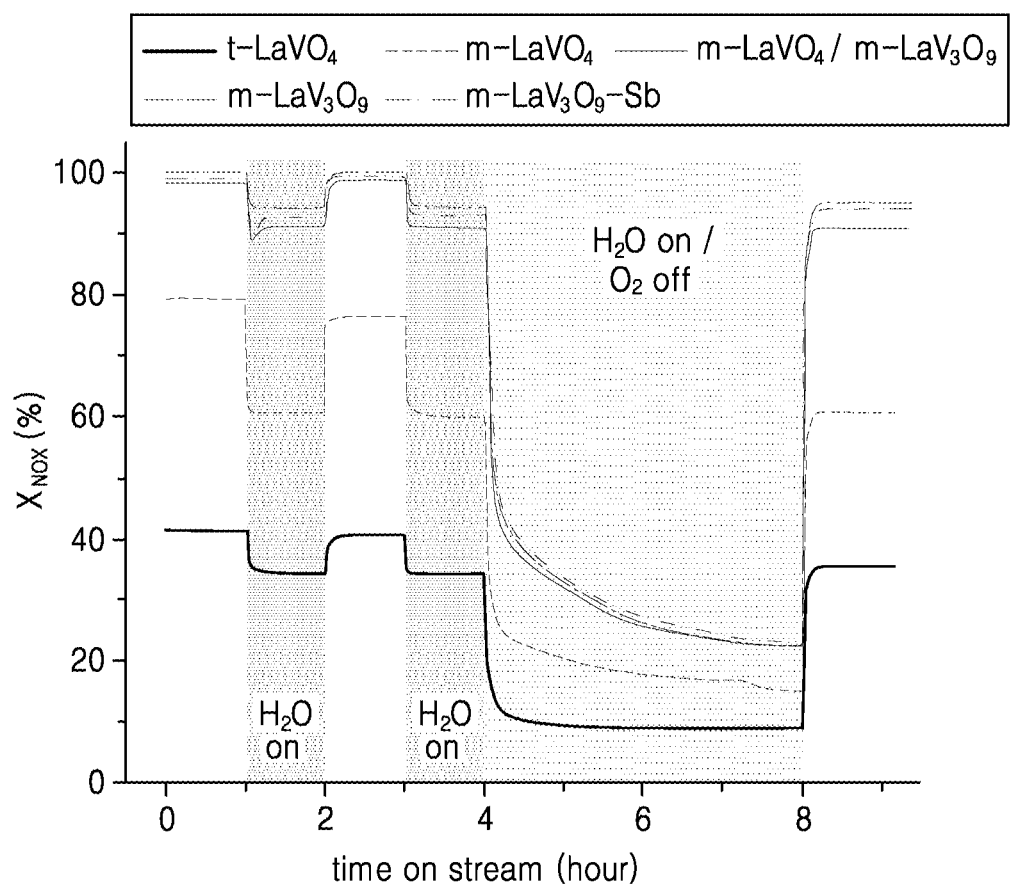
FIGS. 5 to 10 are graphs illustrating SCR performance analysis results of catalysts prepared in examples according to the present invention and comparative examples.

Performance of the SCR process was measured using the catalysts of Examples 1 to 5. $NO_X$ conversion ($X_{NO_X}$) is shown in FIG. 5 when injecting $H_2O$ or $O_2$ at 220° C. As the conditions of the SCR process, a reaction fluid included 800 ppm of $NO_X$, 800 ppm of $NH_3$, 3 vol % of $O_2$, 6 vol % of $H_2O$ and inert gas of $N_2$, a total flow rate was 500 mLmin$^{-1}$, and a space velocity was 30,000 hr$^{-1}$.

Referring to FIG. 5, it was confirmed that $X_{NOX}$ values decreased in all cases of Examples 1 to 5 in the presence of water vapor ($H_2O$) that inhibits adsorption of $NH_3$ during SCR reaction. However, it was confirmed that the $X_{NOX}$ values of the catalysts of Examples 3 to 5 were less decreased than those of the catalysts of Examples 1 and 2, indicating that the catalysts of Examples 3 to 5 had superior resistance to $H_2O$ to that of the catalysts of Examples 1 and 2. In addition, FIG. 5 shows a decreasing tendency of $X_{NOX}$ values of the catalysts in the presence of $H_2O$ under the conditions in which the supply of $O_2$ is shut off. Specifically, the degrees of $X_{NOX}$ value decreases of the catalysts of Examples 3 to 5 were relatively small compared to those of the catalysts of Examples 1 and 2. This indicates that the catalysts of Examples 3 to 5 had excellent redox cycling character during SCR reaction when compared with the catalysts of Examples 1 and 2. In addition, $N_2$ selectivity ($S_{N2}$) of the catalysts was almost 100% over the entire experimental section. This indicates that the appropriate mixture of m-$LaV_3O_9$ or m-$LaV_3O_9$ and m-$LaVO_4$ contained on the surfaces or the Sb oxide as a promotor improved resistance to $H_2O$ and redox cycling character in SCR reaction in the catalysts of Examples 3 to 5.

Experimental Example 3

Performance Analysis of SCR Reaction (2)

Figure 6A:
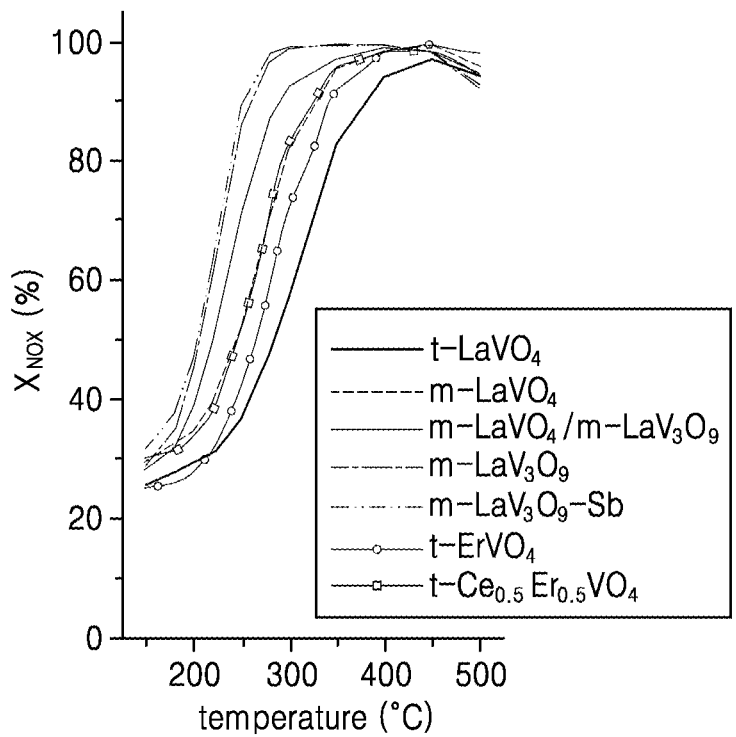
Figure 6B:
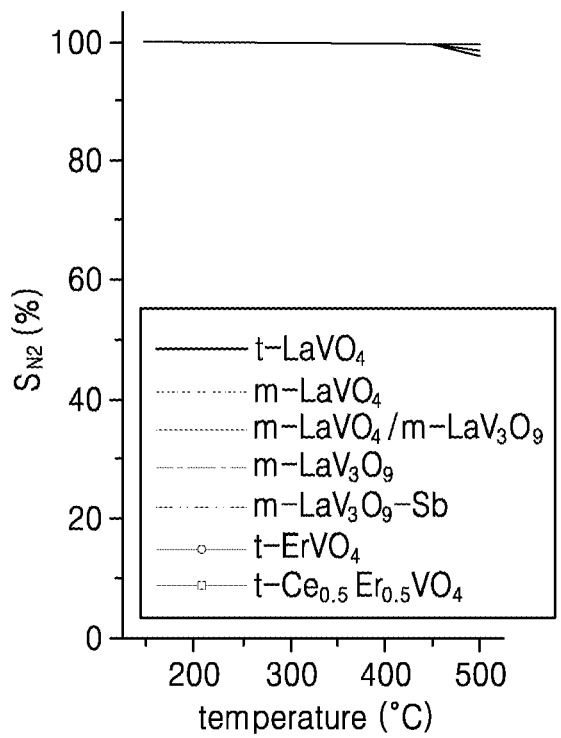

Performance of the SCR process was measured using the catalyst of Examples 1 to 5 and Comparative Examples 1 and 2 using a reaction fluid 800 ppm of $NO_X$, 800 ppm of $NH_3$, 3 vol % of $O_2$, 6 vol % of $H_2O$ and inert gas of $N_2$ at a space velocity of 60,000 hr$^{-1}$ instead of 30,000 hr$^{-1}$. $NO_X$ conversion is shown in FIG. 6A and $N_2$ selectivity is shown in FIG. 6B. Referring to FIGS. 6A and 6B, it was confirmed that the catalysts of Examples 1 to 5 had desirable activities during the reaction at a temperature of 400° C. or lower, similarly to those of Experimental Example 2, despite a considerable amount of water vapor ($H_2O$). For example, $N_2$ selectivity ($S_{N2}$) of the catalysts was almost 100% at a temperature of 400° C. or lower. It was confirmed that the catalysts of Examples 3 to 5 showed relatively large $X_{NOX}$ values at a temperature of 400° C. or lower when compared to the catalysts of Examples 1 and 2. This indicates that the appropriate mixture of m-$LaV_3O_9$ or m-$LaV_3O_9$ and m-$LaVO_4$ contained on the surfaces or the Sb oxide as a promotor improved SCR reaction performance including water vapor ($H_2O$) in the catalysts of Examples 3 to 5. In addition, it was confirmed that the catalysts of Examples 3 to 5 provides similar or relatively large $X_{NOX}$ values compared to the catalysts of Comparative Examples 1 and 2 at a temperature of 400° C. or lower. This indicates that the appropriate mixture of m-$LaV_3O_9$ or m-$LaV_3O_9$ and m-$LaVO_4$ or the Sb oxide as a promotor suggested herein improved denitrification when compared to previously reported t-$ErVO_4$ and t-$Ce_{0.5}Er_{0.5}VO_4$.

Experimental Example 4

Performance Analysis of SCR Reaction (3)

Figure 7A:
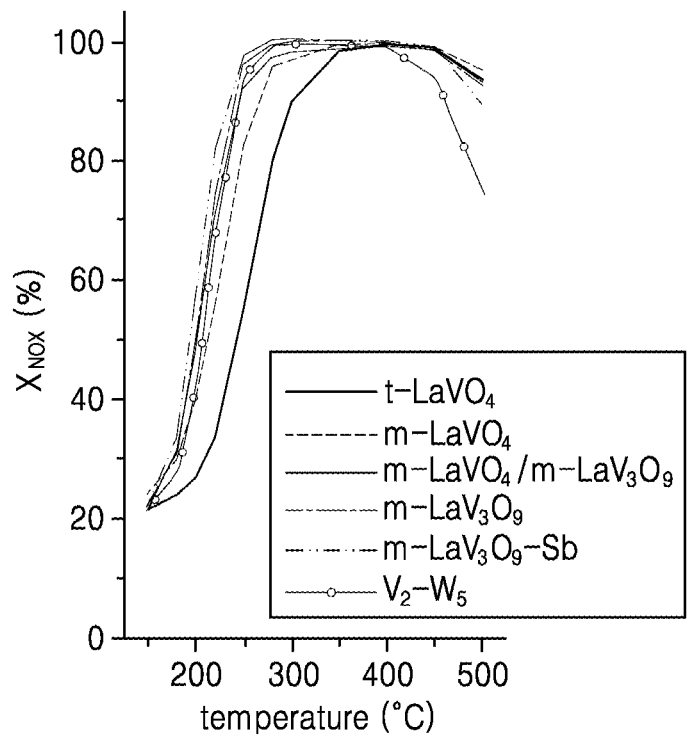
Figure 7B:
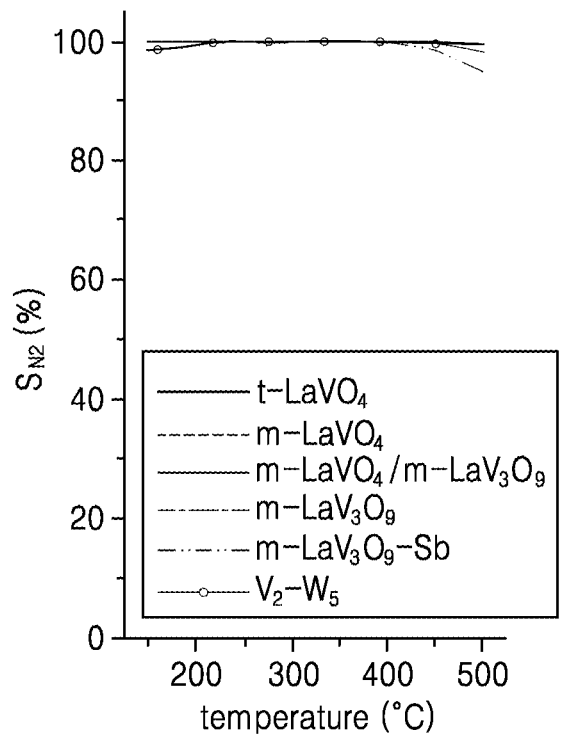

Performance of the SCR process was measured using the catalyst of Examples 1 to 5 and Comparative Example 3 under the same reaction conditions as those of Experimental Example 3 in the presence of 500 ppm of $SO_2$, and $NO_X$ conversion is shown in FIG. 7A and $N_2$ selectivity is shown in FIG. 7B. Referring to FIGS. 7A and 7B, it was confirmed that the catalysts of Examples 1 to 5 had desirable activities during the reaction at a temperature of 400° C. or lower, similarly to those of Experimental Example 3, despite considerable amounts of water vapor ($H_2O$) and sulfur dioxide ($SO_2$). For example, $N_2$ selectivity ($S_{N2}$) of the catalysts was almost 100% at a temperature of 400° C. or lower. It was confirmed that the catalysts of Examples 3 to 5 showed relatively large $X_{NOX}$ values at a temperature of 400° C. or lower when compared to the catalysts of Examples 1 and 2, which are similar or increased $X_{NOX}$ values at a temperature of 400° C. or lower when compared to the catalyst of Comparative Example 3 commonly used in the art. This indicates that the appropriate mixture of m-$LaV_3O_9$ or m-$LaV_3O_9$ and m-$LaVO_4$ contained on the surfaces or the Sb oxide as a promotor minimize poisoning by $SO_2$ in the catalysts of Examples 3 to 5. This indicates that the catalysts of Examples 3 to 5 may be applied as SCR catalysts for reducing $NO_X$ contained in exhaust gas of power plants, sintering furnaces, and ships including a considerably amount of $SO_2$, thereby replacing commercially available catalysts.

Experimental Example 5

Performance Analysis of SCR Reaction (4)

Performance of the SCR process was measured using the catalysts poisoned by Na according to Examples 6 and 7 and the catalyst of Comparative Example 4 under the same reaction conditions as those of Experimental Example 4. As results of the experiment, $NO_X$ conversion is shown in FIG. 8A and $N_2$ selectivity is shown in FIG. 8B.

Figure 8A:
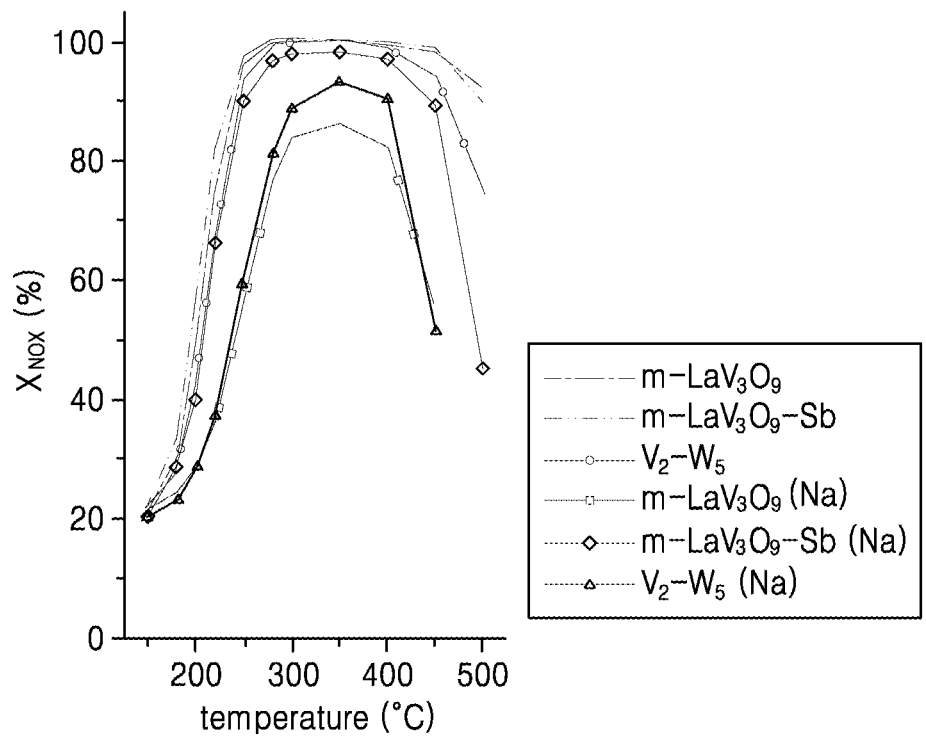
Figure 8B:
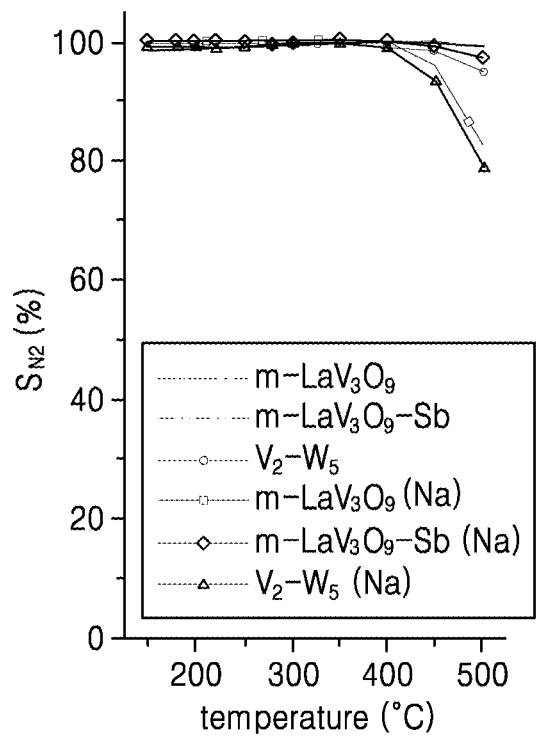

Referring to FIGS. 8A and 8B, it was confirmed that all of the catalysts showed decreased performance by the poisoning substance Na. However, the catalysts of Examples 6 and 7 showed (1) similar or greater $S_{N2}$ values and (2) greater $X_{NOX}$ values than the commercially available catalyst of Comparative Example 4 at a temperature of 500° C. or lower. This indicates that the m-$LaV_3O_9$ or the Sb oxide as a promotor contained on the surfaces of the catalysts of Examples 6 and 7 improved resistance to poisoning by Na. This indicates that the catalysts of Examples 4 and 5 may be applied as SCR catalysts for reducing $NO_X$ contained in exhaust gas of power plants, sintering furnaces, ships, and cement factories including a considerable amount of alkali metal, thereby replacing commercially available catalysts.

Experimental Example 6

Performance Analysis of SCR Reaction (5)

Performance of the SCR process was measured using the catalysts exposed to hydrothermal aging according to Examples 8 and 9 and the catalyst of Comparative Example 5 under the same reaction conditions as those of Experimental Example 4. As results of the experiment, $NO_X$ conversion is shown in FIG. 9A and $N_2$ selectivity is shown in FIG. 9B.

Figure 9A:
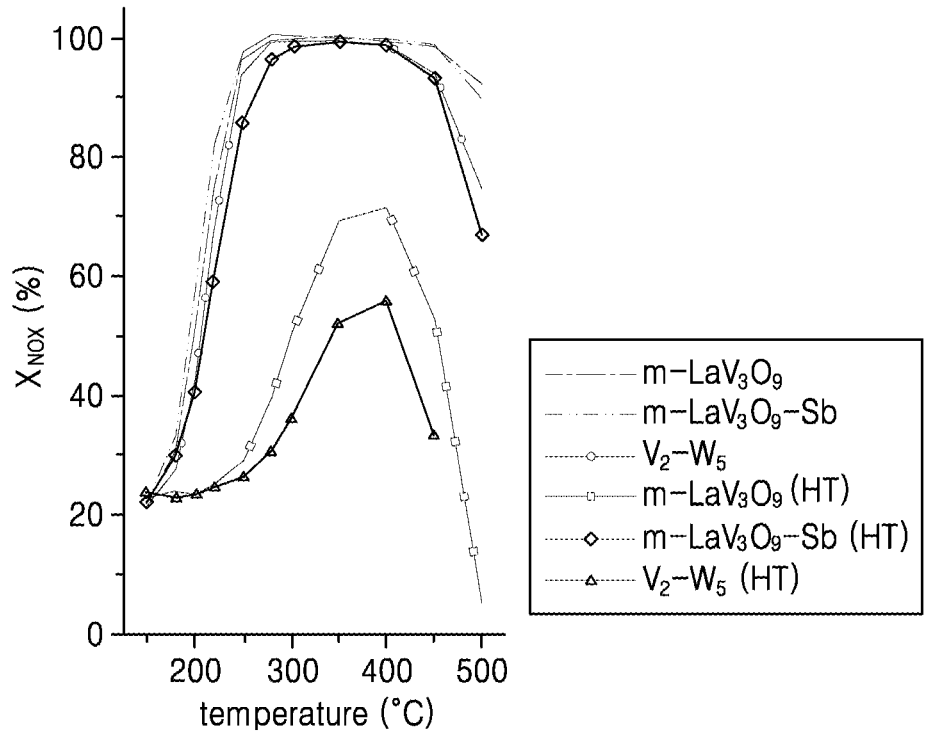
Figure 9B:
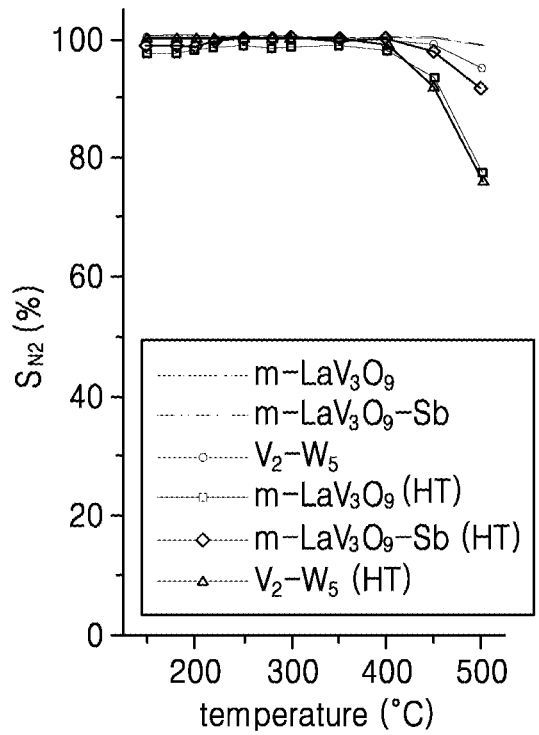

Referring to FIGS. 9A and 9B, it was confirmed that all of the catalysts showed decreased performance by the hydrothermal aging. However, the catalysts of Examples 8 and 9 showed (1) similar or greater $S_{N2}$ values and (2) greater $X_{NOX}$ values than the commercially available catalyst of Comparative Example 5 at a temperature of 500° C. or lower. This indicates that the m-$LaV_3O_9$ or the Sb oxide as a promotor contained on the surfaces of the catalysts of Examples 8 and 9 improved resistance to hydrothermal aging. This indicates that the catalysts of Examples 4 and 5 may be applied as SCR catalysts for reducing $NO_X$ contained in exhaust gas of power plants and heavy equipment periodically exposed to hydrothermal aging, thereby replacing commercially available catalysts.

Experimental Example 7

Performance Analysis of SCR Reaction (6)

Figure 10:
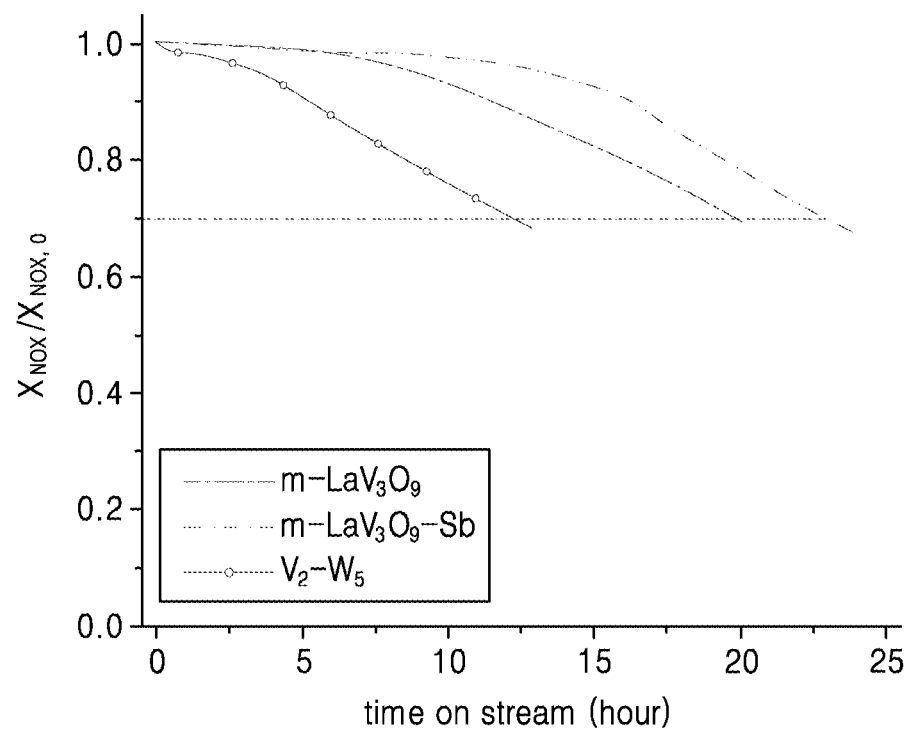

Performance of the SCR process was measured using the catalysts of Examples 4 and 5 and Comparative Example 3 at a space velocity of 30,000 $hr^{-1}$ with a reaction fluid including 800 ppm of $NO_X$, 800 ppm of $NH_3$, 500 ppm of $SO_2$, 3 vol % of $O_2$, 6 vol % of $H_2O$ and inert gas of $N_2$ at 220° C., and the results are shown in FIG. 10. Specifically, the $NO_X$ conversion ($X_{NOX}$) of each catalyst was divided by $NO_X$ conversion ($X_{NOX, 0}$) of the early stage of the reaction (in the absence of $SO_2$). In addition, time required for performance decrease to 70% ($X_{NOX}/X_{NOX,0}$~0.7) of the initial performance by poisoning on the catalyst surface with $H_2O/SO_2$/AS/ABS was measured.

Referring to FIG. 10, it was confirmed that the catalysts of Example 4 (about 20 hours) and Example 5 (about 23 hours) showed improved resistance to poisoning substances when compared to the catalyst of Comparative Example 3 (about 13 hours). This indicates that m-$LaV_3O_0$ or the Sb oxide as a promotor contained on the surface of the catalysts of Examples 4 and 5 provide excellent resistance to the poisoning substances ($H_2O/SO_2$/AS/ABS). This indicates that the catalysts of Examples 4 and 5 may be applied as SCR catalysts for reducing $NO_X$ contained in exhaust gas of power plants, sintering furnaces, ships, and cement factories including considerably amounts of $SO_2$ and $H_2O$, thereby replacing commercially available catalysts.

According to embodiments of the present invention to solve the above problems, a catalyst including at least one of the three types of lanthanum vanadates (tetragonal $LaVO_4$, monoclinic $LaVO_4$, or monoclinic $LaV_3O_9$), which is a composite oxide based on chemical bonds between lanthanum (La) and vanadium (V), as an active site may be manufactured, and thus the surface of the catalyst may have high $NO_X$ conversion and high $N_2$ selectivity during SCR reaction. Also, by applying an oxide of a Group 15 or 16 element as a promotor or functionalizing (sulfating) the surface of the catalyst with $SO_Y^{2-}$ (where Y is 3 or 4), (1) desirable interaction between the surface of the active site and $NO_X$, $NH_3$ and $H_2O$ may be induced, (2) redox cycling character may be improved, and (3) durability against poisoning ($SO_2$, AS, ABS and alkali-metal) or hydrothermal aging that may occur during the SCR reaction may be improved. Based on these advantages, performance and lifespan of heterogeneous catalysts for SCR may be significantly improved. However, these problems are exemplary and the scope of the present invention is not limited thereby.

While one or more embodiments of the present invention have been described with reference to the drawings, it will be understood by those of ordinary skill in the art that various changes in form and details may be made therein without departing from the spirit and scope of the present invention as defined by the following claims.

What is claimed is:

1. A catalyst for reduction of nitrogen oxides comprising:
    an active site including lanthanum vanadate represented by at least one of Formula 1 and Formula 2; and
    a support carrying the active site;
    wherein Formula 1 is
    $LaVO_4$ wherein $LaVO_4$ is polymorphous and has a tetragonal or monoclinic crystal structure; and
    wherein Formula 2 is LaV$_3$O$_9$ wherein LaV$_3$O$_9$ has a monoclinic crystal structure; and wherein at least one portion of the surface of the catalyst is sulfated.

2. The catalyst of claim 1, wherein the support further comprises a promoter that is an oxide of a Group 15 or 16 element.

3. The catalyst of claim 2, wherein an amount of the promotor is in the range of 1 wt % to 5 wt % based on an amount of the support.

4. The catalyst of claim 2, wherein the Group 15 or 16 element is one element selected from the group consisting of nitrogen (N), phosphorus (P), sulfur (S), arsenic (As), selenium (Se), antimony (Sb), tellurium (Te), bismuth (Bi), polonium (Po), moscovium (Mc), and livermorium (Lv), or any combination thereof.

5. The catalyst of claim 1, wherein the support further comprises one of carbon (C), Al$_2$O$_3$, MgO, ZrO$_2$, CeO$_2$, TiO$_2$, and SiO$_2$.

6. The catalyst of claim 1, wherein the amount of the lanthanum vanadate represented by Formula 1 or the lanthanum vanadate represented by Formula 2 is in the range of $10^{-4}$ parts by weight to 50 parts by weight based on 100 parts by weight of the support.

7. The catalyst of claim 1, wherein the support has a porous structure.

8. A method of manufacturing a catalyst for reduction of nitrogen oxides, the method comprising:

mixing a vanadium precursor solution with a lanthanum precursor solution;

adding a material constituting a support to the mixed solution; and obtaining solids from the mixed solution, and calcining the solids to prepare a catalyst including a support carrying a lanthanum vanadate represented by Formula 1 or 2 as an active site or both a lanthanum vanadate represented by Formula 1 as a first active site and a lanthanum vanadate represented by Formula 2 as a second active site, LaVO$_4$, wherein LaVO$_4$, is polymorphous and has a tetragonal or monoclinic crystal structure   Formula 1

LaV$_3$O$_9$ wherein LaV$_3$O$_9$ has a monoclinic crystal structure; and   Formula 2 wherein at least one portion of the surface of the catalyst is sulfated.

9. The method of claim 8, wherein the vanadium precursuor solution comprises a solution in which at least one of NH$_4$VO$_3$, NaVO$_3$, VCl$_2$, VCl$_3$, VBr$_3$, VCl$_3$·3C$_4$H$_8$O, VO(C$_5$H$_7$O$_2$)$_2$, VO(OC$_2$H$_5$)$_3$, VC$_{10}$H$_{10}$Cl$_2$, VC$_{18}$H$_{14}$I, VOCl$_3$, VOF$_3$, VO(OCH(CH$_3$)$_2$)$_3$, V(C$_5$H$_7$O$_2$)$_3$, VOSO$_4$, and V(C$_5$H$_5$)$_2$ is dissolved.

10. The method of claim 8, wherein the lanthanum precursor solution comprises a solution in which at least one of LaF$_3$, LaB$_6$, LaCl$_3$, La(CH$_3$CO$_2$)$_3$, LaI$_3$, La$_2$(C$_2$O$_4$)$_3$, La(CF$_3$SO$_3$)$_3$, La(NO$_3$)$_3$, La(C$_9$H$_{21}$O$_3$), La(C$_5$H$_7$O$_2$)$_3$, LaBr$_3$, LaPO$_4$, La$_2$(CO$_3$)$_3$, La(OH)$_3$, and La$_2$(SO$_4$)$_3$ is dissolved.

* * * * *